(12) United States Patent
Ravindranath

(10) Patent No.: US 11,938,437 B2
(45) Date of Patent: Mar. 26, 2024

(54) FILTER SYSTEM AND METHOD

(71) Applicant: Transportation IP Holdings, LLC, Norwalk, CT (US)

(72) Inventor: Balaji Hosadurgam Ravindranath, Mysore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 169 days.

(21) Appl. No.: 17/167,995

(22) Filed: Feb. 4, 2021

(65) Prior Publication Data
US 2022/0241713 A1  Aug. 4, 2022

(51) Int. Cl.
*B01D 46/71* (2022.01)
*B01D 46/00* (2022.01)
*B01D 46/42* (2006.01)

(52) U.S. Cl.
CPC ......... *B01D 46/71* (2022.01); *B01D 46/0039* (2013.01); *B01D 46/0056* (2013.01); *B01D 46/4281* (2013.01); *B01D 2279/40* (2013.01)

(58) Field of Classification Search
None
See application file for complete search history.

(56) References Cited

U.S. PATENT DOCUMENTS 2,920,579 A * 1/1960 Grimm ................ B67D 1/0043
222/131
3,144,983 A  8/1964 Ljungstrom et al.
4,141,701 A * 2/1979 Ewan ...................... B01D 47/10
261/78.2
4,481,130 A * 11/1984 Robertson ............... B01F 25/50
210/708

(Continued)

FOREIGN PATENT DOCUMENTS

CA    3054545 A1 * 10/2018  .......... B01D 29/085
EP    1918009 A1   5/2008

(Continued)

OTHER PUBLICATIONS

James Elkins, S550 Gets Reimagined with Wild Hood-Exit Turbos, Oct. 18, 2022, DragZine, All pages https://web.archive.org/web/20221024212846/https://www.dragzine.com/features/car-features/s550-gets-reimagined-with-wild-hood-exit-turbos/ (Year: 2022).*

(Continued)

*Primary Examiner* — Brit E. Anbacht
(74) *Attorney, Agent, or Firm* — Mary D. Lawlor; The Small Patent Law Group, LLC

(57) ABSTRACT

A filter system and method include a filter configured to receive a first fluid mixture via an inlet. The first fluid mixture includes a first fluid and debris. The filter is shaped to separate a portion of the debris from the first fluid. A fluid control device is fluidly coupled with the filter. The fluid control device receives the first fluid from the filter and changes a characteristics of the first fluid. A conduit is fluidly coupled with the filter and a second fluid source. The conduit receives the debris from the filter and a second fluid from the second fluid source. The conduit combines the debris with the second fluid to form a second fluid mixture within the conduit. The conduit is shaped to control one or more of a pressure or a velocity within the conduit to direct the second fluid mixture through the conduit toward an outlet.

18 Claims, 5 Drawing Sheets

(56) References Cited

U.S. PATENT DOCUMENTS

| | | | |
|---|---|---|---|
| 4,537,608 A | 8/1985 | Koslow | |
| 5,632,243 A | 5/1997 | Buchholz | |
| 6,502,397 B1* | 1/2003 | Lundqvist | F02M 26/21 60/605.1 |
| 2004/0062689 A1* | 4/2004 | Gauthier | C10G 11/18 239/398 |
| 2005/0089408 A1* | 4/2005 | Solomon | B01F 25/31242 417/151 |
| 2008/0086989 A1* | 4/2008 | Sheidler | B01D 45/12 55/345 |
| 2010/0193607 A1* | 8/2010 | Berbee | B01J 19/26 239/398 |
| 2010/0252656 A1* | 10/2010 | Gerbron | B05B 11/062 239/318 |
| 2010/0301498 A1* | 12/2010 | Matsumura | B01F 33/053 261/118 |
| 2012/0125202 A1* | 5/2012 | Remo | A47J 31/4485 99/286 |
| 2016/0177894 A1 | 6/2016 | Duquesne et al. | |

FOREIGN PATENT DOCUMENTS

| | | |
|---|---|---|
| EP | 3193005 A1 | 7/2017 |
| WO | 2017001121 A1 | 1/2017 |
| WO | WO-2023006278 A1 * | 2/2023 |

OTHER PUBLICATIONS

Extended European Search Report for corresponding EP Application No. 22153681.6-1101 dated Jun. 17, 2022 (7 pages).

Office Action for corresponding JP Application No. 202210112308.X dated Aug. 19, 2023 (19 pages).

Office Action for corresponding EP Application No. 22153681.6-1101 dated Jul. 21, 2022 (6 pages).

* cited by examiner

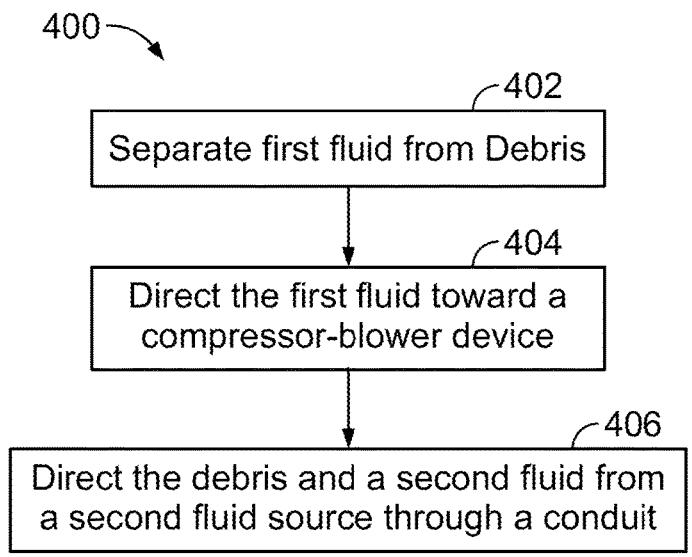

FILTER SYSTEM AND METHOD

BACKGROUND

Technical Field

The subject matter described herein relates to filter systems and methods.

Discussion of Art

Large vehicles and facilities may have air volumetric flow requirements that are larger than volumetric requirements of smaller vehicle systems or facilities. In order to meet the increased volumetric requirements, large systems that need to circulate increased levels of air or other fluids may rely on atmospheric air as the fluid source. The air can be directed into the system via an inlet disposed proximate an exterior surface of the system (e.g., on a roof of a building, an outside surface of a rail vehicle, the housing of an appliance or system, or the like). The air may be directed through a filter that separates debris or contaminants from the air. The clean air is directed through ducting toward a main blower or compressor disposed at another location. For example, a rail vehicle may have a filter disposed at an exterior wall of the vehicle, and the air may be directed to a main blower that is disposed within the interior of the vehicle. The blower within the vehicle is fluidly coupled with the filter via ducting or other conduits or passages. A secondary blower or a similar suction device may be coupled with the filter and may be used to remove the debris from the filter.

Existing filter systems, however, are not without issues. As one example, the secondary blower used to clean the filter is an active component and requires electrical energy to operate, increasing the amount of energy used by the system. As another example, if the secondary blower fails, the debris may not be removed from the filter, causing the life of the filter and the fluid system to be reduced. As another example, the ducting fluidly coupling the filter with the main blower disposed are costly to furbish, difficult to clean, and reduce an efficiency of the system. Alternative integrated systems that eliminate the secondary blower and/or the duct may be needed.

BRIEF DESCRIPTION

In one or more embodiments, a filter system includes a filter configured to receive a first fluid mixture via an inlet. The first fluid mixture includes a first fluid and debris. The filter is shaped to separate at least a portion of the debris from the first fluid. A fluid control device is fluidly coupled with the filter. The fluid control device receives the first fluid from the filter and changes a characteristics of the first fluid. A conduit is fluidly coupled with the filter and a second fluid source. The conduit receives the at least the portion of the debris from the filter and a second fluid from the second fluid source. The conduit combines the at least the portion of the debris with the second fluid within the conduit to form a second fluid mixture. The conduit is shaped to control one or more of a pressure or a velocity within the conduit to direct the second fluid mixture through the conduit toward an outlet.

In one or more embodiments, a method includes separating a first fluid of a first fluid mixture from debris of the first fluid mixture within a filter, and directing the first fluid toward a fluid control device. The debris and a second fluid from a second fluid source are directing through a conduit. The conduit combines the debris with the second fluid to form a second fluid mixture. The conduit is shaped to control one or more of a pressure or a velocity within the conduit to direct the second fluid mixture through the conduit toward an outlet.

In one or more embodiments, a filter system includes a filter configured to receive a first fluid mixture via an inlet. The first fluid mixture includes a first fluid and debris. The filter is shaped to separate at least a portion of the debris from the first fluid. A compressor-blower device is fluidly coupled with the filter. The compressor-blower device receives the first fluid from the filter and changes a characteristics of the first fluid to form a second fluid. A conduit is fluidly coupled with the filter and the compressor-blower device. The conduit receives the portion of the debris from the filter and a portion of the second fluid from the compressor-blower device. The conduit combines the portion of the debris with the second fluid within the conduit to form a second fluid mixture. The conduit is shaped to control one or more flow characteristics of one or more of the portion of the debris, the second fluid, or the second fluid mixture within the conduit. The filter, the compressor-blower device, and the conduit are disposed within a common housing.

BRIEF DESCRIPTION OF THE DRAWINGS

The inventive subject matter may be understood from reading the following description of non-limiting embodiments, with reference to the attached drawings, wherein below:

FIG. 4 illustrates a flowchart of one example of a method for directing fluid and debris through a filter system;

FIG. 5 illustrates a flowchart of one example of directions of fluid moving through a filter system.

DETAILED DESCRIPTION

Embodiments of the subject matter described herein relate to a filter system and a method of directing fluid and debris through the filter system. The filter system includes a filter that receives a fluid mixed with debris, and separates at least a portion of the debris from the fluid. The fluid is directed toward a fluid control device that changes a characteristic of the fluid, such as a pressure or energy level of the fluid to form a second fluid (e.g., a higher-energy fluid). In one or more embodiments, the fluid control device may be a compressor, a blower, a combination compressor-blower device, or the like.

The filter system includes a conduit fluidly coupled with the filter and the fluid control device. The conduit receives second fluid from the fluid control device. The debris is directed out of the filter and toward the conduit based on the characteristics of the second fluid and the shape of the conduit. For example, the second fluid generates or increases a suction within the conduit to promote movement of the debris from the filter toward the conduit. The second fluid is mixed or combined with the debris within the conduit. The conduit is shaped to control a pressure within the conduit to direct the second fluid mixture (e.g., including the second fluid and the debris) through the conduit and toward an outlet of the conduit.

Figure 1:
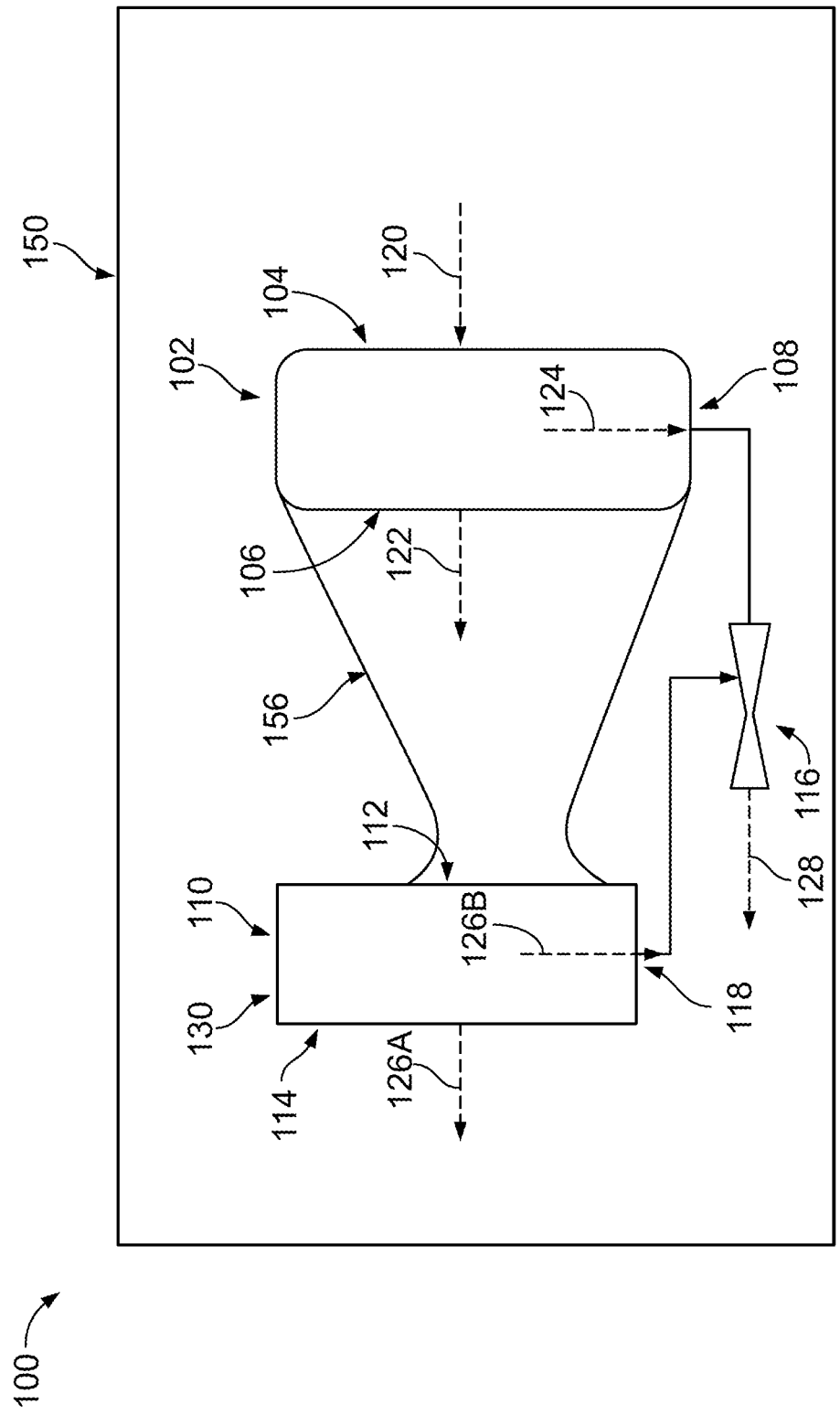
FIG. 1 illustrates one example of a filter system in accordance with one embodiment.

FIG. 1 illustrates one example of a filter system 100 in accordance with one embodiment. The filter system may be used or disposed onboard a vehicle system such as a rail vehicle, a car or other passenger vehicle, a mining vehicle, a bus, an aircraft, agricultural equipment, or another off-highway vehicle. Optionally, the filter system may be disposed within a facility such as a laboratory, a storage facility, a school, an office building, a gymnasium, an arena, or any alternative building or facility that may require filtration of atmospheric air.

The filter system includes a filter 102 that receives a first fluid mixture 120 via an inlet 104. The first fluid mixture includes a first fluid 122 and debris 124. In one example, the inlet may be disposed on an exterior side or wall of a building and the first fluid mixture may be atmospheric air combined with debris (e.g., contaminants, pollutants, foreign particles, dust, sand, or the like) mixed with the air. Optionally, the first fluid may a gaseous-phase of a fluid, a liquid-phase of a fluid, a gas-liquid mixture of a fluid, or the like.

The filter receives the first fluid mixture and separates at least a portion of the debris from the first fluid. In one embodiment, the filter may be a spin filter that may include a structure disposed proximate the inlet 104 that promotes the rotation of the first fluid mixture in one or more cyclonic and/or centrifugal directions within the filter. The cyclonic rotation of the first fluid mixture may promote the debris to move toward interior surfaces of the filter and the first fluid to move away from the interior surfaces of the filter to separate some of the debris from the first fluid. Optionally, the filter may include a mesh screen or other component that is sized to permit the first fluid to pass through and prohibit the debris from passing through the screen. Optionally, the filter may be an alternative filter system that may use alternative methods or include other features that may be used to promote the separation of at least the portion debris from the first fluid.

The filter includes a first outlet 106 that directs the first fluid out of the filter, and a second outlet 108 that directs the debris out of the filter. The first fluid is directed through a passage 156 that fluidly couples the filter with a fluid control device 110. The fluid control device may be a compressor, a blower, or a combination compressor-blower device, or an alternative device that controls fluid. In the illustrated embodiment of FIG. 1, the passage has a constricting shape between the first outlet of the filter and an inlet 112 of the fluid control device. Optionally, the passage may have any alternative shape and/or size. In one embodiment, a surface of the filter may be shared with a surface of the fluid control device such that the first outlet of the filter is the same or common passage or opening as the inlet of the fluid control device. For example, the passage 156 between the filter and the fluid control device may be removed or eliminated from the filter system.

The fluid control device receives the first fluid from the filter and changes one or more characteristics of the first fluid within the fluid control device. In one or more embodiments, the fluid control device may compress the first fluid to form a second fluid 126 that has a pressure that is greater than the first fluid. Optionally, the fluid control device may change a flow rate, direction of movement, volumetric flow rate, velocity, pressure, turbulence, rotational forces, or the like, of the first fluid to form the second fluid. In one or more embodiments, the fluid control device may direct a first portion of the second fluid 126A out of the fluid control device via a first outlet 114 and may direct a second portion of the second fluid 126B out of the fluid control device via a second outlet 118.

In the illustrated embodiment of FIG. 1, the fluid control device and the filter are fluidly coupled with a conduit 116. The filter directs the debris out of the filter via the second outlet toward the conduit, and the fluid control device directs the portion of the second fluid out of the second outlet and toward the conduit. In one or more embodiments, the fluid control device may also be referred to as a second fluid source 130. For example, the fluid control device provides the second fluid to the conduit. In one or more embodiments, the portion of the second fluid directed out of the fluid control device and toward the conduit may be referred to as bleed fluid, bleed compressed air or gas, compressor bleed fluid, bleed steam, or the like.

Figure 2:
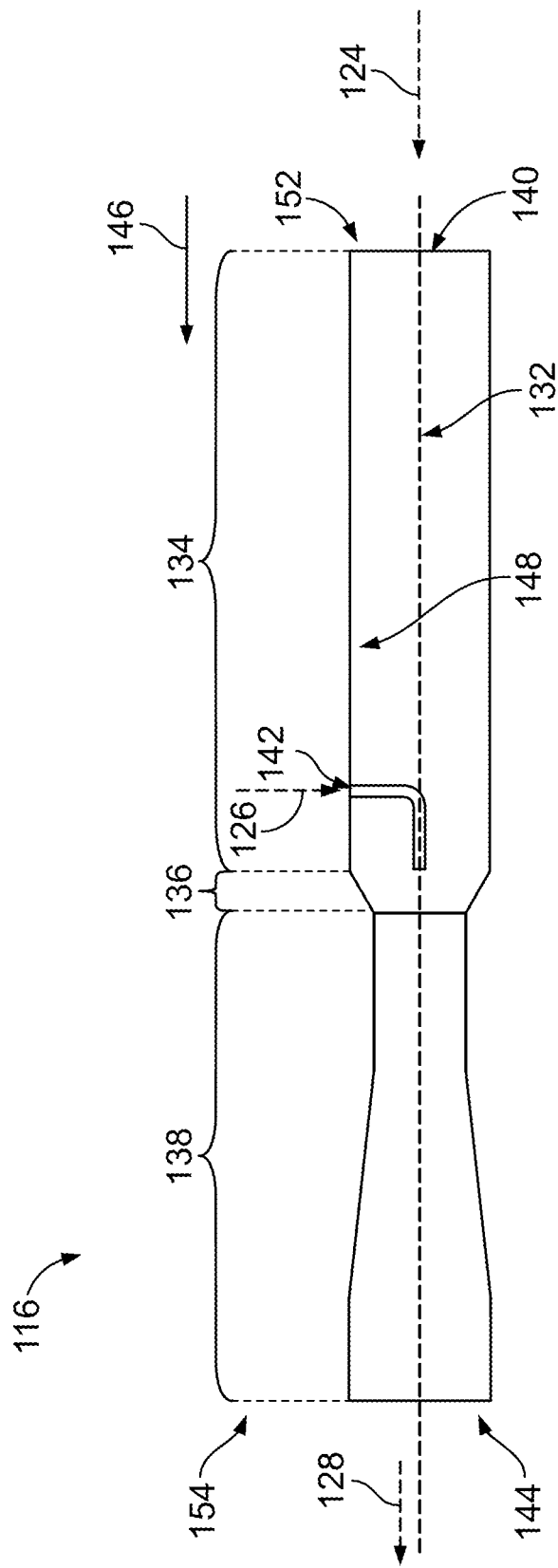
FIG. 2 illustrates a conduit of the filter system shown in FIG. 1 in accordance with one embodiment.

FIG. 2 illustrates a cross-sectional view of the conduit in accordance with one embodiment. The conduit extends along an axis 132 between a first end 152 and a second end 154. The conduit includes a first inlet 140 disposed proximate the first end and a second inlet 142 disposed at a location between the first and second ends of the conduit along the axis. The first inlet is substantially aligned with the axis. The second inlet that directs the second fluid into the conduit includes a bend such that the second fluid is first directed along a first axis into the conduit that is substantially perpendicular to the axis 132 of the conduit, and then in a direction along the axis of the conduit such that the second fluid is directed into the body of the conduit in a direction substantially parallel with the axis of the conduit. Alternatively, the first and/or second inlets may have alternative configurations. The debris is directed into the conduit via the first inlet and the portion of the second fluid 126B is directed into the conduit via the second inlet. The second fluid and the debris combine within the conduit to form a second fluid mixture 128 within the conduit. The debris, the second fluid, and the second fluid mixture move in a direction of flow 146 within the conduit.

The conduit is shaped to control flow characteristics of one or more of the debris, the second fluid, and the second fluid mixture. In one or more embodiments, the conduit may be referred to as a venturi device or system, an ejector, a vacuum ejector, pump, or the like. The conduit includes a first section 134, a second section 136 downstream of the first section, and a third section 138 downstream of the second section between the first and second ends of the conduit. The debris and the second fluid are received within the first section of the conduit and combine or mix to form the second fluid mixture. Optionally, the position of the first inlet and corresponding location of the second inlet may be changed along the axis.

The first, second, and third sections are shaped and sized to control flow characteristics of the debris, the second fluid, and/or the second fluid mixture. In the illustrated embodiment, the first section of the conduit has a substantially uniform cross-sectional size about the axis, but alternatively could have a non-uniform cross-sectional shape and size at any location within the first section. The size of the conduit decreases within the second section in the direction of flow along the axis relative to the first section. For example, the second section may be referred to as a converging section, a step-down section, or the like, such that the size of the conduit decreases within the second section in the direction of flow. The size of the conduit increases at one or more locations within the third section along the axis relative to the second section. For example, the venturi system or the conduit has a decreasing cross-sectional size (e.g., in the second section) and in increasing cross-sectional size downstream from the decreasing cross-sectional size (e.g., the third section downstream of the second section) in the direction of flow.

Figure 6:
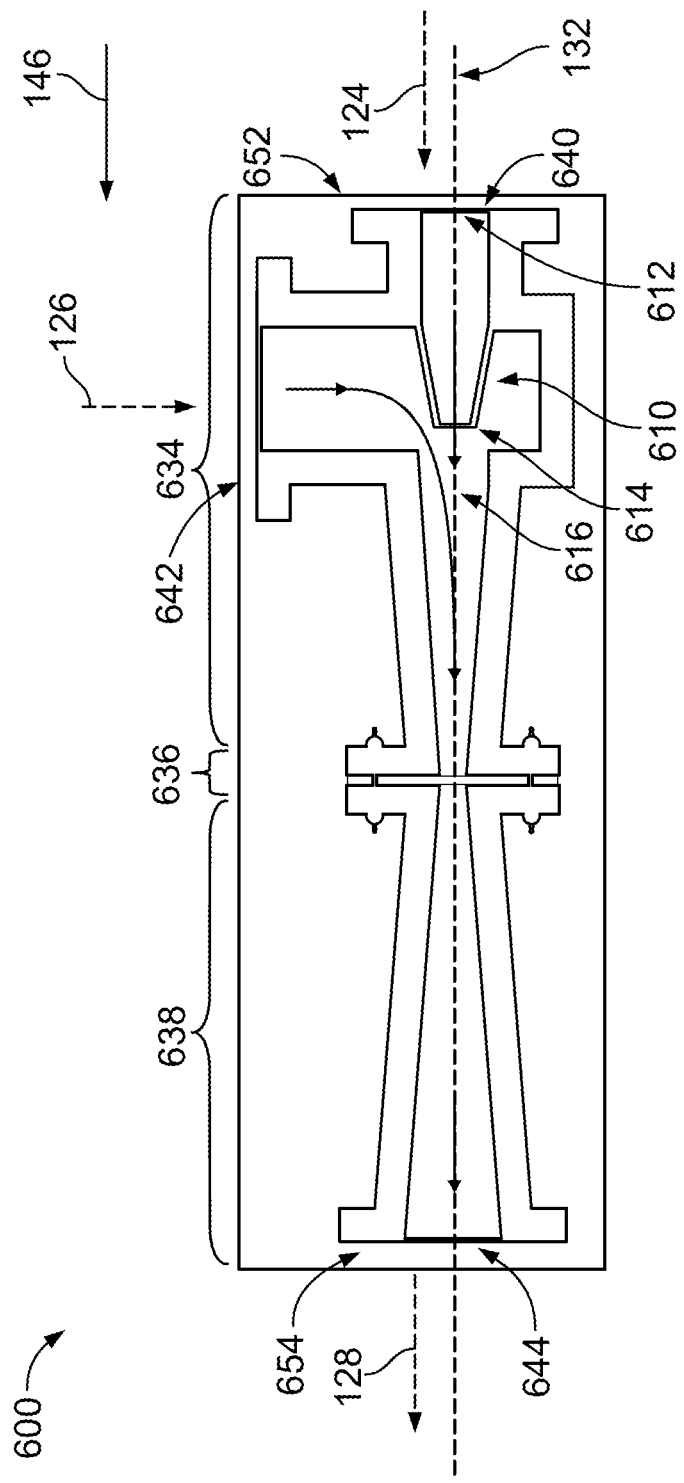
FIG. 6 illustrates a cross-sectional view of a conduit of a filter system in accordance with one embodiment.

Optionally, the conduit may have any alternative shape and/or size in order for the conduit to control one or more different flow characteristics of the debris, the second fluid, and/or the second fluid mixture. One or more sections of the conduit may have an alternative size relative to another section, one or more sections may have an alternative shape (e.g., circular, rectangular, elliptic, or the like) relative to another section, or any combination therein. For example, FIG. 6 illustrates a cross-sectional view of a conduit 600 in accordance with another embodiment. The conduit extends along the axis 132 between a first end 652 and the second end 654. The conduit includes a first inlet 640 disposed proximate the first end and is substantially aligned with the axis. The first inlet of the conduit includes a nozzle 610 including a nozzle inlet 612 and a nozzle outlet 614. The debris 124 is directed into the conduit via the first inlet, and is directed through the nozzle toward a cavity 616 of the conduit.

The conduit includes a second inlet 642 disposed at a location between the first and second ends along the axis and directs the second fluid 126 toward the cavity of the conduit. Unlike the conduit shown in FIG. 2, the second inlet directs the second fluid into the cavity of the conduit in a direction substantially perpendicular to the axis of the conduit.

The conduit includes a first section 634, a second section 636 downstream of the first section, and a third section 638 downstream of the second section. The first section has a decreasing cross-sectional size along the axis, and the third section has an increasing cross-sectional size along the axis. For example, the size of the conduit decreases and then increases in the direction of flow 146 along the axis. The second fluid mixes or combines with the debris within the conduit to form the second fluid mixture 128 that is directed out of the conduit via an outlet 644 as exhaust or reject. The conduit is shaped to control flow characteristics of the second fluid mixture within the conduit, such that the uniformity of the second fluid mixture improves as the second fluid mixture moves through the conduit toward the outlet. For example, the debris may be more uniformly mixed with the second fluid as a location within the third section of the conduit relative to a less uniformly mixed second fluid mixture within the first and second sections of the conduit. Optionally, the conduit may have any alternative shape and/or size, may have any number of sections having uniform and/or unique shapes and/or sizes, may include one or more protrusions or components disposed within the cavity of the conduit to control flow characteristics of the fluids, or any combination therein.

In one or more embodiments, the conduit may be shaped to control flow rates, directions of movement, volumetric flow rates, velocities, temperatures, pressures, turbulence, rotational forces, or the like, of one or more of the debris, one or more portions of the second fluid, or the second fluid mixture. In one or more embodiments, the conduit may be shaped to control flow characteristics of the debris prior to the debris moving through the first inlet of the conduit. For example, the conduit may be shaped to control characteristics of the debris and/or the first fluid, such as within the filter. Optionally, the conduit may be shaped to control flow characteristics of the second fluid prior to the second fluid moving through the second inlet of the conduit. For example, the conduit may be shaped to control a pressure, flow rate, a volumetric flow rate, flow volume, velocity, temperature, or the like, of the second fluid while the second fluid is in the fluid control device, while the second fluid is moving toward the conduit, or the like.

In one or more embodiments, the pressure of the second fluid may control one or more flow characteristics of the debris and/or the first fluid. For example, the second fluid directed into the conduit may create or increase a suction within the filter to promote directing the debris out of the filter and toward the conduit. The debris may be directed out of the filter and toward the conduit based on the pressure of the second fluid and the shape and/or size of the conduit.

Returning to FIG. 1, the conduit includes plural internal surfaces 148 between the first end and the second end. In one or more embodiments, the conduit may include one or more protrusions, obstructions, objects, or the like, disposed or operably coupled with one or more of the internal surfaces to change flow characteristics of the second fluid, the debris, or the second fluid mixture within the conduit. Optionally, a portion of one or more of the internal surfaces may be textured and/or shaped internally to change one or more characteristics of the second fluid, the debris, and/or the second fluid mixture as the fluid and debris moves within the conduit.

The second fluid mixture is directed out of the conduit via an outlet 144 disposed proximate the second end of the conduit. In one embodiment, the second fluid mixture may be directed out to the atmosphere for rejection. Optionally, the second fluid mixture may be directed toward a collection system and/or alternative device (not shown).

The filter system including the filter, the fluid control device (e.g., the second fluid source), and the conduit are disposed within a common housing 150. For example, the filter system may be formed and provided as an integrated cell or system that may be installed into or onto, used with, or the like, a vehicle system, a facility, an enclosure, or the like. For example, filter may be disposed proximate to the fluid control device such that filter system requires a reduced amount of duct, vent, or other conduit materials extending between the filter and the fluid control device relative to filter systems that include filters disposed a distance away from fluid control devices and that are not disposed within a common housing.

The filter system may be referred to as a self-cleaning filter system such the debris is directed out of the filter system toward the conduit by using high-energy fluid from another component (e.g., the fluid control device) within the filter system. For example, the filter system is a partially closed cleaning system such that the filter system can remove debris from the filter system without using another blower device, such as an exhauster blower, and without requiring additional electrical power to operate an additional blower device. For example, the filter system pulls or sucks out the debris and a portion of the first fluid toward the conduit by using the high energy second fluid supplied by the fluid control device of the filter system. The conduit and the high energy second fluid provided by the fluid control device provides an evacuation system to pull or suck the debris out of the filter and the filter system.

Figure 3:
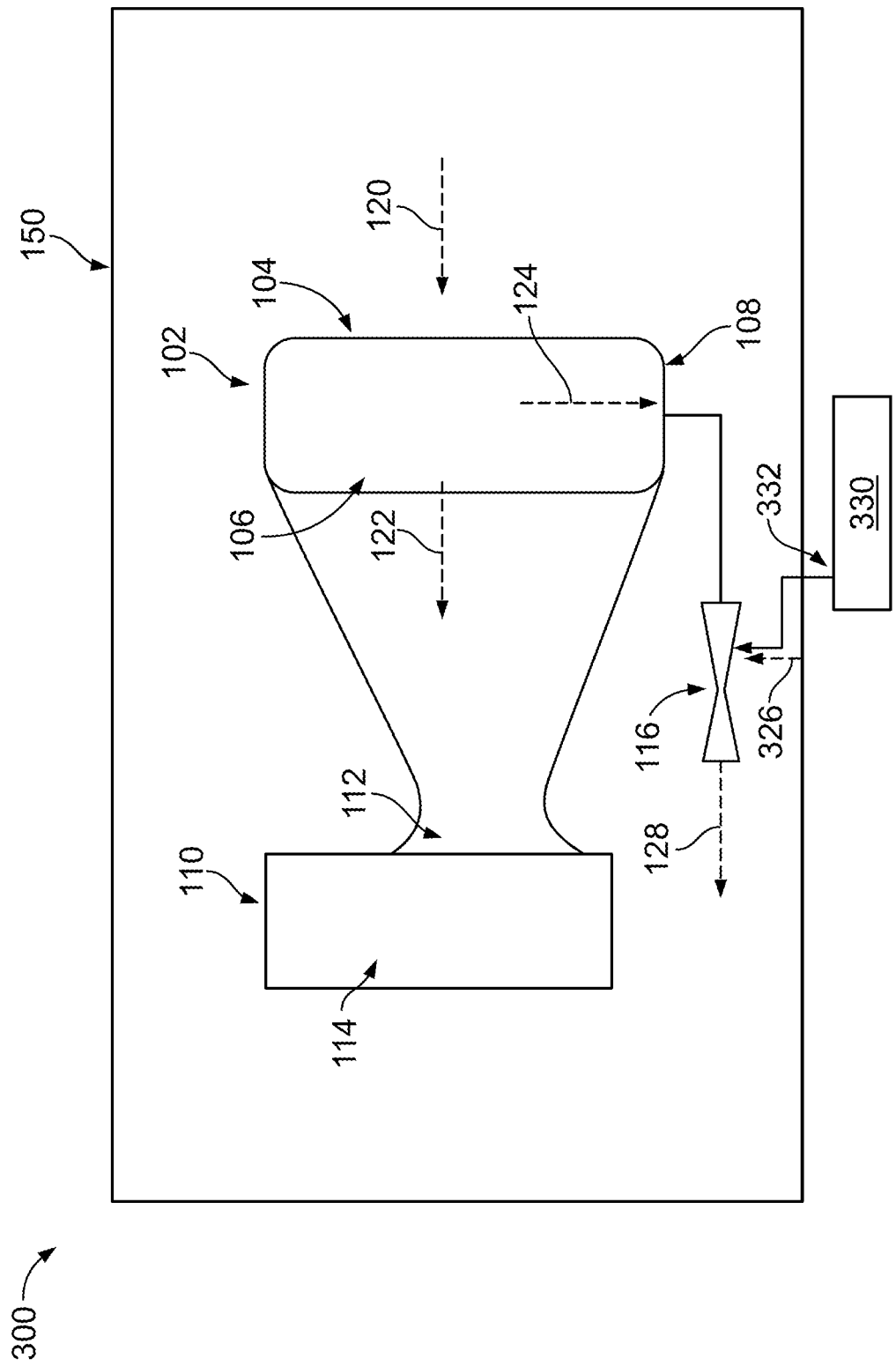
FIG. 3 illustrates one example of a filter system in accordance with one embodiment.

FIG. 3 illustrates one example of a filter system 300 in accordance with one embodiment. Like the filter system 100 shown in FIG. 1, the filter system 300 includes the filter that receives the first fluid mixture 120 via the inlet 104. The filter separates at least a portion of the debris 124 from the first fluid 122, and directs the first fluid out of the filter via the first outlet 106 and directs the debris out of the filter via the second outlet 108. The first fluid is directed toward the fluid control device 110 (e.g., a compressor-blower device) and the debris is directed toward the conduit 116.

Unlike the filter system shown in FIG. 1, the filter system 300 includes a second fluid source 330 that provides a second fluid 326 to the conduit. The second fluid source is disposed outside of the common housing. For example, the second source is a device or system that is different from the fluid control device. In one embodiment, the second fluid source may be another compressor or compressor device, such as a brake compressor of a vehicle system. For example, the brake compressor may provide the second fluid (e.g., bleed air) to the conduit to control the flow characteristics of the fluid and debris within the conduit. Optionally, the second fluid source may be another source that provides high energy fluid (e.g., air, steam, water, or the like).

In one or more embodiments, the conduit may be fluidly coupled with the fluid control device and the second source 330. For example, one or more valves (not shown) or other controls may be used to control the flow of the second fluid such that the fluid control device may supply the second fluid to the conduit, that the other second source may supply the second fluid to the conduit, or that both the fluid control device and the other second source may each supply at least a portion of the second fluid to the conduit. In one or more embodiments the valves may be manually controlled by an operator and/or automatically controlled by a control system. For example, a control system may automatically control which of the fluid control device or the second fluid source provides the second fluid to the conduit. Optionally, the control system may determine and/or control an amount of the second fluid that may be directed to the conduit by remotely controlling the valves to open to different open-positions. Optionally, the control system may determine an amount of the second fluid and which of the fluid control device or the second fluid source is to provide the second fluid to the conduit, and may communicate instructions to an operator to manually change one or more settings of the valves.

In one or more embodiments, the filter system may be disposed onboard a vehicle system that may be operably and/or communicatively coupled with a back-office server of a positive vehicle control (PVC) system or positive control system (PCS), or a "negative control system (NCS). For example, in a PCS, vehicles have onboard systems that prevent the vehicles from performing one or more operations unless a signal is received from an off-board source granting permission to perform the operation, and in a NCS, vehicles may include onboard systems that allow the vehicle to perform the one or more operations unless a signal is received from an off-board source prohibiting the performance of the one or more operations. The back-office server may determine which of the fluid control device or the second source is to provide the second fluid to the conduit, and may remotely control one or more valves to control directing the second fluid toward the conduit from the fluid control device, the second source, or from both the fluid control device and the second source.

FIG. 4 illustrates a flowchart 400 of one example of a method for directing fluid and debris through a filter system. The operations described in connection with the method can be performed by the filter system shown in FIG. 1 or FIG. 3, or an alternative filter system.

At 402, at least a portion of debris of a first fluid mixture is separated from a first fluid of the first fluid mixture. The first fluid mixture may be atmospheric air, industrial gases, or the like mixed or combined with particles, debris, or other contaminants. Optionally, the first fluid may be a liquid-phase, gas-phase, or liquid-gas-mixture phase of an alternative fluid. The filter may be shaped and sized to control flow characteristics of the first fluid mixture to promote the separation of at least a portion of the debris from the first fluid. For example, the filter may separate some of the debris from the first fluid, and another portion of the debris may not be separated from the first fluid. In one embodiment, the filter may be a spin filter that is shaped to rotate the first fluid mixture in one or more cyclonic directions to separate the debris from the first fluid. In another embodiment, the filter may be shaped to direct the fluid mixture to move in other directions to separate the debris from the first fluid. Optionally, the filter may include a mesh screen or other component that is sized to permit the first fluid to pass through and prohibit the debris from passing through the screen. Optionally, the filter may separate the debris from the first fluid by any alternative methods.

At 404, the first fluid is directed toward a fluid control device, such as a compressor-blower device, and at 406, the debris and a second fluid from a second fluid source are directed toward and through a conduit. In one embodiment, the compressor-blower device may be the second fluid source. The compressor-blower device may receive the first fluid and change a characteristic of the first fluid to form the second fluid. For example, the second fluid may have an energy, pressure, or velocity that is greater than an energy, pressure, or velocity of the first fluid. A portion of the second fluid may be directed out of the compressor-blower device and toward the conduit to mix with the debris within the conduit and another portion of the second fluid may be directed out of the compressor-blower device and out of the filter system (e.g., toward another system). Alternatively, the second fluid source may be a compressor device or system other than the compressor-blower device.

FIG. 5 illustrates a flowchart 500 of one example of directions of fluids and debris moving through a filter system in accordance with one embodiment. The fluids and debris may be directed through the filter system shown in FIG. 1, the filter system shown in FIG. 3, or an alternative configuration of a filter system.

At 502, a first fluid mixture comprising a first fluid and debris is directed into the filter system, and at 504, the first fluid mixture is received by a filter of the filter system. The first fluid mixture may be received from the atmosphere, another system, or the like. The filter may be a spin filter, a spin cleaner, a centrifuge filter, or the like, such that the filter separates at least some of the debris from the first fluid. The first fluid may be directed out of the filter via one outlet, and the debris may be directed out of the filter via another outlet. At 510, the first fluid (e.g., without the debris or with a reduced amount of the debris) is directed out of the filter and may be directed toward a fluid control device such that the cleaned first fluid may be used for and/or within a system.

At 506 a second fluid is directed toward a conduit of the filter system. The conduit may also be referred to as an ejector, ejector system, venturi, venturi system, or the like. The second fluid has an energy level that is greater than an energy of the first fluid mixture. In one embodiment, the second fluid may be directed toward the conduit from a fluid control device of the filter system, such as a compressor-blower device. Optionally, the second fluid may be directed toward the conduit from a separate system outside of the filter system. The second fluid may be referred to as bleed fluid, bleed compressed air or gas, compressor bleed fluid, bleed steam, or the like.

At 508, the debris directed from the filter toward the conduit and the second fluid is directed toward the conduit are mixed to form a second fluid mixture within the conduit. The conduit is shaped to change flow characteristics of the second fluid mixture. For example, at 512, the conduit may change flow rates, directions of movement, volumetric flow rates, pressures, an amount of turbulence, rotational forces, or the like, of the second fluid, the debris, and/or the second fluid mixture as the second fluid mixture moves within the conduit. For example, the debris be better mixed with or more uniformly mixed with the second fluid at a location proximate the outlet of the conduit relative to a location proximate an inlet of the conduit through which the debris is received. For example, as the second fluid mixture moves within the conduit, the uniformity of the mixture may improve. The second fluid mixture may be directed out of the conduit for rejection, for use within an alternative system, or the like.

In one or more embodiments of the subject matter described herein, a filter system includes a filter configured to receive a first fluid mixture via an inlet. The first fluid mixture includes a first fluid and debris. The filter is shaped to separate at least a portion of the debris from the first fluid. A fluid control device is fluidly coupled with the filter. The fluid control device receives the first fluid from the filter and changes a characteristics of the first fluid. A conduit is fluidly coupled with the filter and a second fluid source. The conduit receives the at least the portion of the debris from the filter and a second fluid from the second fluid source. The conduit combines the at least the portion of the debris with the second fluid within the conduit to form a second fluid mixture. The conduit is shaped to control one or more of a pressure or velocity within the conduit to direct the second fluid mixture through the conduit toward an outlet.

Optionally, the conduit extends along an axis and includes a decreasing cross-sectional size and an increasing cross-sectional size downstream of the decreasing cross-sectional size in a direction of flow along the axis.

Optionally, the fluid control device may be the second fluid source and is fluidly coupled with the conduit. The fluid control device may direct the second fluid toward the conduit to form the second fluid mixture within the conduit.

Optionally, the fluid control device may receive the first fluid from the filter and change a characteristic of the first fluid to form the second fluid. The fluid control device may direct a portion of the second fluid toward the conduit and direct another portion of the second fluid out of the fluid control device.

Optionally, the filter may rotate the first fluid mixture in one or more cyclonic directions to separate the at least the portion of the debris from the first fluid.

Optionally, the filter, the fluid control device, and the conduit may be disposed within a common housing.

Optionally, the second fluid source may be disposed outside of the common housing.

Optionally, the conduit may be shaped to control one or more of a flow rate, a direction of movement, a volumetric flow rate, a temperature, a turbulence, or a rotational force of one or more of the debris, the second fluid, or the second fluid mixture.

Optionally, a portion of one or more internal surfaces of the conduit may be textured to change one or more characteristics of the second fluid mixture as the second fluid mixture moves within the conduit.

Optionally, the second fluid may have an energy level that is greater than an energy level of one or more of the first fluid mixture or the first fluid.

In one or more embodiments of the subject matter described herein, a method includes separating a first fluid of a first fluid mixture from debris of the first fluid mixture within a filter, and directing the first fluid toward a fluid control device. The debris and a second fluid from a second fluid source are directing through a conduit. The conduit combines the debris with the second fluid to form a second fluid mixture. The conduit is shaped to control one or more of a pressure or a velocity within the conduit to direct the second fluid mixture through the conduit toward an outlet.

Optionally, the fluid control device may be the second fluid source, and the method may include directing the second fluid from the fluid control device toward the conduit to form the second fluid mixture within the conduit.

Optionally, the first fluid mixture may be rotated in one or more cyclonic directions to separate the debris from the fluid.

Optionally, the filter, the fluid control device, and the conduit may be disposed within a common housing.

Optionally, the second fluid source may be disposed outside of the common housing.

Optionally, one or more of a flow rate, a direction of movement, a volumetric flow rate, a temperature, a turbulence, or a rotational force of one or more of the debris, the second fluid, or the second fluid mixture may be controlled based on the shape of the conduit.

Optionally, a portion of one or more internal surfaces of the conduit may be textured to change one or more characteristics of the second fluid mixture within the conduit.

Optionally, the second fluid may have an energy level that is greater than an energy level of one or more of the first fluid mixture or the first fluid.

In one or more embodiments of the subject matter described herein, a filter system includes a filter configured to receive a first fluid mixture via an inlet. The first fluid mixture includes a first fluid and debris. The filter is shaped to separate at least a portion of the debris from the first fluid. A compressor-blower device is fluidly coupled with the filter. The compressor-blower device receives the first fluid from the filter and changes a characteristics of the first fluid to form a second fluid. A conduit is fluidly coupled with the filter and the compressor-blower device. The conduit receives the at least the portion debris from the filter and a portion of the second fluid from the compressor-blower device. The conduit combines the at least the portion of the debris with the second fluid within the conduit to form a second fluid mixture. The conduit is shaped to control one or more flow characteristics of one or more of the at least the portion of the debris, the second fluid, or the second fluid mixture within the conduit as the conduit directs the second fluid mixture through the conduit toward an outlet. The filter, the compressor-blower device, and the conduit are disposed within a common housing.

Optionally, the compressor-blower device may direct the portion of the second fluid toward the conduit, and another portion of the second fluid out of the compressor-blower device via an outlet of the compressor-blower device.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the clauses if they have structural elements that do not differ from the literal language of the clauses, or if they include equivalent structural elements with insubstantial differences from the literal language of the clauses.

What is claimed is:

1. A filter system comprising:
a filter configured to receive a first fluid mixture via an inlet, the first fluid mixture comprising a first fluid and debris, the filter shaped to separate a portion of the debris from the first fluid;
a fluid control device fluidly coupled with the filter, the fluid control device configured to receive the first fluid from the filter and change a characteristic of the first fluid to form a second fluid within the fluid control device, the fluid control device configured to direct a first portion of the second fluid out of the fluid control device via a first outlet of the fluid control device and direct a second portion of the second fluid out of the fluid control device via a second outlet of the fluid control device; and
a conduit fluidly coupled with the filter and the fluid control device, the conduit configured to receive the portion of the debris from the filter and the second portion of the second fluid from the fluid control device,
the conduit extending along an axis and comprising a section including an increasing cross-sectional size along the axis, the conduit configured to receive the portion of the debris and the second portion of the second fluid at a location that is upstream along a direction of flow from the section including the increasing cross-sectional size, the conduit configured to combine the portion of the debris with the second portion of the second fluid within the conduit upstream of the section including the increasing cross-sectional size to form a second fluid mixture, the conduit shaped to control one or more of a pressure or a velocity within the conduit to direct the second fluid mixture through the conduit toward an outlet.

2. The filter system of claim 1, wherein the fluid control device is configured to receive the first fluid from the filter and separate the second fluid into the first portion of the second fluid and the second portion of the second fluid.

3. The filter system of claim 1, wherein the filter is shaped to rotate the first fluid mixture in one or more cyclonic directions in the filter.

4. The filter system of claim 1, wherein the filter, the fluid control device, and the conduit are disposed within a common housing.

5. The filter system of claim 1, wherein the fluid control device is disposed outside of a common housing.

6. The filter system of claim 1, wherein the conduit is shaped to control one or more of a flow rate, direction of movement, a volumetric flow rate, a temperature, a turbulence, or rotational force of one or more of the debris, the second portion of the second fluid, or the second fluid mixture.

7. The filter system of claim 1, wherein a portion of one or more internal surfaces of the conduit is textured to change one or more characteristics of the second fluid mixture within the conduit.

8. The filter system of claim 1, wherein the second fluid has an energy level that is greater than an energy level of one or more of the first fluid mixture or the first fluid.

9. A method comprising:
separating a first fluid of a first fluid mixture from debris of the first fluid mixture within a filter;
directing the first fluid toward a fluid control device;
changing a characteristic of the first fluid to form a second fluid within the fluid control device;
separating a first portion of the second fluid from a second portion of the second fluid;
directing the first portion of the second fluid out of the fluid control device via a first outlet of the fluid control device and directing the second portion of the second fluid out of the fluid control device via a second outlet of the fluid control device; and
receiving the debris and the second portion of the second fluid from the fluid control device within a conduit, the conduit comprising a section including an increasing cross-sectional size along an axis, the conduit configured to receive the debris and the second fluid at a location that is upstream along a direction of flow from the section including the increasing cross-sectional size, the conduit configured to combine the debris with the second fluid to form a second fluid mixture, the conduit shaped to control one or more of a pressure or a velocity within the conduit to direct the second fluid mixture through the conduit toward an outlet.

10. The method of claim 9, further comprising directing the second portion of the second fluid from the fluid control device via the second outlet toward the conduit to form the second fluid mixture within the conduit.

11. The method of claim 9, further comprising rotating the first fluid mixture in one or more cyclonic directions to separate the debris from the first fluid.

12. The method of claim 9, wherein the filter, the fluid control device, and the conduit are disposed within a common housing.

13. The method of claim 9, wherein the fluid control device is disposed outside of a common housing.

14. The method of claim 9, further comprising controlling one or more of a flow rate, direction of movement, a volumetric flow rate, a temperature, a turbulence, or rotational force of one or more of the debris, the second portion of the second fluid, or the second fluid mixture based on a shape of the conduit.

15. The method of claim 9, wherein a portion of one or more internal surfaces of the conduit is textured to change one or more characteristics of the second fluid mixture within the conduit.

16. A filter system comprising:
a filter configured to receive a first fluid mixture via an inlet, the first fluid mixture comprising a first fluid and debris, the filter shaped to separate a portion of the debris from the first fluid;
a fluid control device fluidly coupled with the filter, the fluid control device configured to receive the first fluid from the filter and change a characteristic of the first fluid to form a second fluid, the fluid control device configured to separate a first portion of the second fluid from a second portion of the second fluid by directing the first portion of the second fluid out of the fluid control device via a first outlet and directing the second portion of the second fluid out of the fluid control device via a second outlet; and
a conduit fluidly coupled with the filter and the second outlet of the fluid control device, the conduit configured to receive the portion of the debris from the filter and the second portion of the second fluid from the fluid control device, the conduit comprising a section including an increasing cross-sectional size along an axis of the conduit, the conduit configured to receive the portion of the debris and the portion of the second fluid at a location that is upstream along a direction of flow from the section including the increasing cross-sectional size, the conduit configured to combine the portion of the debris with the second fluid within the conduit to form a second fluid mixture, the conduit shaped to control one or more flow characteristics of one or more of the portion of the debris, the second fluid, or the second fluid mixture within the conduit,
wherein the filter, the fluid control device, and the conduit are disposed within a common housing.

17. The filter system of claim 16, wherein the second fluid has an energy level that is greater than an energy level of one or more of the first fluid mixture or the first fluid.

18. The filter system of claim 1, wherein the fluid control device includes a fluid control inlet configured to receive the first fluid from the filter, the fluid control inlet fluidly coupled with both of the first outlet and the second outlet of the fluid control device.

* * * * *